(12) United States Patent
Boutinon

(10) Patent No.: US 8,419,183 B2
(45) Date of Patent: Apr. 16, 2013

(54) METHOD OF PREPARING AN OPHTHALMIC LENS FOR MOUNTING IN A CAMBERED EYEGLASS FRAME

(75) Inventor: Stéphane Boutinon, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 708 days.

(21) Appl. No.: 12/634,774

(22) Filed: Dec. 10, 2009

(65) Prior Publication Data

US 2010/0157243 A1   Jun. 24, 2010

(30) Foreign Application Priority Data

Dec. 12, 2008 (FR) ...................... 08 06986

(51) Int. Cl.
*G02C 7/02* (2006.01)
*G02C 13/00* (2006.01)
(52) U.S. Cl.
USPC .................. 351/159.73; 351/178
(58) Field of Classification Search . 351/159.74–159.77
See application file for complete search history.

(56) References Cited

U.S. PATENT DOCUMENTS

2009/0262302 A1   10/2009   Chauveau et al.

FOREIGN PATENT DOCUMENTS

| FR | 2901031 A1 | * 11/2007 |
| FR | 2 906 047 | 3/2008 |
| FR | 2 910 674 | 6/2008 |
| FR | 2 915 290 | 10/2008 |
| WO | 2007/012713 | 2/2007 |
| WO | 2007/128925 | 11/2007 |
| WO | WO 2007128925 A1 | * 11/2007 |

OTHER PUBLICATIONS

French Search Report dated Sep. 3, 2009, from corresponding PCT application.

* cited by examiner

*Primary Examiner* — James Greece
(74) *Attorney, Agent, or Firm* — Young & Thompson

(57) ABSTRACT

A preparation method includes: acquiring a frame of reference of ophthalmic lens defined at least by a first centering point and by a first orientation direction; acquiring a frame of reference of the rim of the eyeglass frame defined at least by a second centering point and a second orientation direction; acquiring a longitudinal profile representative of the shape of the rim and identified in the frame of reference of the rim; acquiring a curvature parameter or a curvature compensation parameter relating to the camber of the eyeglass frame; and putting the two frames of reference into coincidence, by positioning the two centering points relative to each other and by orienting the two orientation directions relative to each other as a function of the curvature parameter or the curvature compensation parameter so as to define the position and the orientation of the longitudinal profile in the frame of reference of the ophthalmic lens.

17 Claims, 4 Drawing Sheets

METHOD OF PREPARING AN OPHTHALMIC LENS FOR MOUNTING IN A CAMBERED EYEGLASS FRAME

TECHNICAL FIELD TO WHICH THE INVENTION RELATES

The present invention relates in general to the field of eyeglasses and more particularly to mounting ophthalmic lenses of a pair of corrective lenses in a frame.

The invention relates more particularly to a method of preparing an ophthalmic lens for mounting in a rim of an eyeglass frame.

A particularly advantageous application of the invention lies in centering ophthalmic lenses for mounting in eyeglass frames that are strongly cambered.

TECHNOLOGICAL BACKGROUND

The technical portion of an optician's profession consists in mounting a pair of ophthalmic lenses in a frame selected by a wearer. Such mounting comprises four main operations:

reading the outlines of the bezels in the rims of the frame selected by the wearer, i.e. the outlines of the grooves that run around the inside of each of the rims of the frame, said reading providing an image of the shape of the final outline that is to be presented by each ophthalmic lens once it has been shaped;

centering each lens, i.e. determining the position that each lens is to occupy in the frame so as to be properly centered facing the pupil of the wearer's eye, in such a manner as to enable the lens to act appropriately in performing the optical function for which it has been designed;

blocking each lens, which consists in depositing a blocking member on each lens at a position that is deduced from defined centering parameters; and shaping each lens, which consists in machining or cutting out the lens to match the outline felt on the frame, with this being performed while the lens is held by means of the blocking member.

In the context of the present invention, attention is paid to the second operation known as centering. Specifically, for the optician, this consists in defining the position to be occupied by the final outline relative to the optical frame of reference of said lens (typically relating to its usual marks or to its optical centering point), in such a manner that the lens is properly positioned facing the pupil of the wearer's eye so as to perform as well as possible the optical function for which it has been designed.

In a first stage, this operation consists in centering the final outline of the lens on the centering point of the lens so that once centered the line of gaze of the wearer passes through the centering point of the lens.

In a second stage, this operation then consists in orienting the final outline of the lens about the centering point of the lens so that once oriented, the reference axis of the lens (typically its cylinder axis or its horizontal axis) presents a desired angle relative to the horizon line of the frame.

The Applicant has found that in spite of the care given to performing those four operations, it can happen that ophthalmic lenses are not correctly positioned relative to the frame, thereby leading to visual discomfort for the wearer.

OBJECT OF THE INVENTION

An object of the present invention is to provide a method of preparation that enables the centering and orientation error of ophthalmic lenses in the eyeglass frame selected by the wearer to be avoided or at least to be reduced.

More particularly, the method provides a method of preparing an ophthalmic lens for mounting in a rim of an eyeglass frame, the method comprising the steps consisting in:

acquiring a frame of reference of the ophthalmic lens defined at least by a first centering point and by a first orientation direction;

acquiring firstly a frame of reference of the rim of the eyeglass frame defined at least by a second centering point and by a second orientation direction, and secondly a longitudinal profile that is representative of the shape of the rim and that is identified in the frame of reference of the rim;

acquiring a curvature parameter or a curvature compensation parameter relating to the camber of the eyeglass frame; and putting the frames of reference of the ophthalmic lens and of the rim of the eyeglass frame into coincidence, by positioning the two centering points relative to each other and by orienting the two orientation directions relative to each other in such a manner as to define the position and the orientation of the longitudinal profile in the frame of reference of the ophthalmic lens.

The eyeglass market is changing and increasing numbers of vision-correcting eyeglass frames are now on offer that are strongly cambered, i.e. that are strongly curved so as to wrap around the wearer's face. In such frames, the mean plane of each rim slopes strongly relative to the general plane of the frame.

In the context of its research work, the Applicant has determined that centering errors are due to the fact that the position of the horizon line of the frame is acquired in the general plane of the frame, whereas the orientation of the final outline of the lens is determined in the plane of the lens, i.e. in the plane of the rim of the frame.

Since those two planes can be strongly inclined relative to each other and since the orientation of the outline on the frame does not take account of that inclination, the camber of the frame gives rise to a centering error. By means of the present invention, the orientation of the final outline is calculated as a function of a general parameter relating to the curvature of the frame, so as to eliminate those centering errors.

The general parameter is preferably a curvature parameter, i.e. a parameter relating to the curvature angle formed between the mean plane of each rim and the general plane of the frame.

In a variant, the general parameter could equally well be a curvature compensation parameter, i.e. a parameter relating to the angular correction to be applied to the orientation of the final outline so as to compensate for the centering error due to the curvature of the frame.

Other advantageous and non-limiting characteristics of the invention are as follows:

there is provided a step of determining a pantoscopic parameter or a pantoscopic compensation parameter relating to the vertical inclination of the rim relative to the general plane of the eyeglass frame, and the relative orientation of the two orientation directions is determined as a function of said pantoscopic parameter or of said pantoscopic compensation parameter;

there is provided a step of determining a pantoscopic parameter or a pantoscopic compensation parameter relating to the vertical inclination of the rim relative to the general plane of the eyeglass frame, and the relative positioning of the two centering points is performed as a function of said pantoscopic parameter or of said pantoscopic compensation parameter;

the two centering points are positioned relative to each other as a function of said curvature parameter or of said curvature compensation parameter;

said curvature parameter is deduced by feeling the bezels of the two rims of the eyeglass frame, the feeling being performed with or without contact;

a search is made in a database register in which each record is associated with a referenced eyeglass frame type and contains a curvature parameter or a curvature compensation parameter specific to said referenced eyeglass frame type, for a record corresponding to said eyeglass frame, and then if a corresponding record is found, said acquisition step is performed by reading in said corresponding record said curvature parameter or said curvature compensation parameter, or else if no corresponding record is found, said acquisition step is followed by a step of writing a new record in the register corresponding to said eyeglass frame in which the acquired curvature parameter or curvature compensation parameter is stored;

searching a database register in which each record is associated with a referenced eyeglass frame type and contains a pantoscopic parameter or a pantoscopic compensation parameter specific to said referenced eyeglass frame type, for a record corresponding to said eyeglass frame, then if a corresponding record is found, performing said determination step by reading said pantoscopic parameter or said pantoscopic compensation parameter from said corresponding record, or else if no corresponding record is found, following said determination step with a step of writing a new record in the register corresponding to said eyeglass frame, in which the determined pantoscopic parameter or pantoscopic compensation parameter is stored;

putting the frames of reference of the ophthalmic lens and of the rim of the eyeglass frame comprises:

a) a step of superposing the two frames of reference, during which the two centering points are superposed and the two orientation directions are oriented relative to each other in accordance with a prescription for the future wearer of the eyeglass frame; and then b) a step of offsetting the two frames of reference, during which, firstly the second centering point is offset relative to the first centering point by an offset vector deduced from said curvature parameter or from said curvature compensation parameter, and secondly the second orientation direction is offset angularly relative to the first orientation direction by an offset angle deduced from said curvature parameter or from said curvature compensation parameter;

said curvature compensation parameter is constituted by said offset angle;

there is provided a step of displaying in superposition, firstly the longitudinal profile defined in the frame of reference of the ophthalmic lens superposed on the frame of reference of the rim of the eyeglass frame, and secondly the longitudinal profile defined in the frame of reference of the ophthalmic lens offset and put into coincidence relative to the frame of reference of the rim of the eyeglass frame;

there is provided a step of displaying the longitudinal profile defined in the frame of reference of the ophthalmic lens after it has been put into coincidence relative to the frame of reference of the rim of the eyeglass frame;

during the display step, the outline of the non-shaped ophthalmic lens is displayed in superposition on the longitudinal profile defined in the frame of reference of the ophthalmic lens as put into coincidence relative to the frame of reference of the rim of the eyeglass frame;

there is provided a step of blocking the ophthalmic lens by means of a blocking device, during which a blocking member is fastened on the ophthalmic lens at a given blocking point and with a given blocking orientation; and a step of shaping the ophthalmic lens by means of a shaper device, during which the ophthalmic lens is shaped so as to present, on its edge face, an engagement ridge or groove extending along the longitudinal profile;

the frames of reference of the ophthalmic lens and of the rim of the eyeglass frame are put into coincidence before the ophthalmic lens is blocked, so that the position of the blocking point and the orientation of the blocking are determined in the frame of reference of the rim of the eyeglass frame after it has been put into coincidence with the frame of reference of the ophthalmic lens; and the frames of reference of the ophthalmic lens and of the rim of the eyeglass frame are put into coincidence after the ophthalmic lens has been blocked and before the ophthalmic lens is shaped.

DETAILED DESCRIPTION OF AN EMBODIMENT

The following description with reference to the accompanying drawings given as non-limiting examples shows clearly what the invention consists in and how it can be reduced to practice.

The object of the method of preparation of the invention is to determine the position to be occupied by two ophthalmic lenses 10, i.e. a left ophthalmic lens and a right ophthalmic lens, in an eyeglass frame 20 so as to ensure that the lenses are properly centered facing the pupils of the eyes of the wearer, so that they perform properly the optical functions for which they are designed. The description below relates more specifically to the preparation method used for centering the left ophthalmic lens 10 relative to the left rim 21 of the frame 20.

Figure 6:
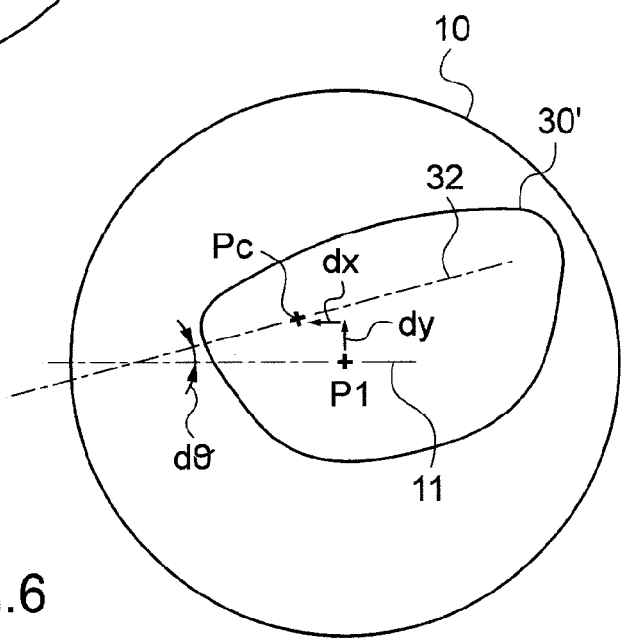
FIG. 6 is a diagrammatic face view of the FIG. 4 ophthalmic lens with the longitudinal profile of FIG. 3 put into coincidence therewith.

As shown in FIG. 6, for the optician, the concrete problem is to define the position of a longitudinal profile 30' to be adopted by the ophthalmic lens 10 once shaped, relative to the optical frame of reference of said lens (typically its usual marks, or its optical centering point P1).

A particularly advantageous implementation of the method involves a computer program suitable for executing the steps of the centering method as described in software incorporated in a centering device or a blocking device or a shaper device that is provided with a processor unit and optionally with a monitor screen.

Figure 7:
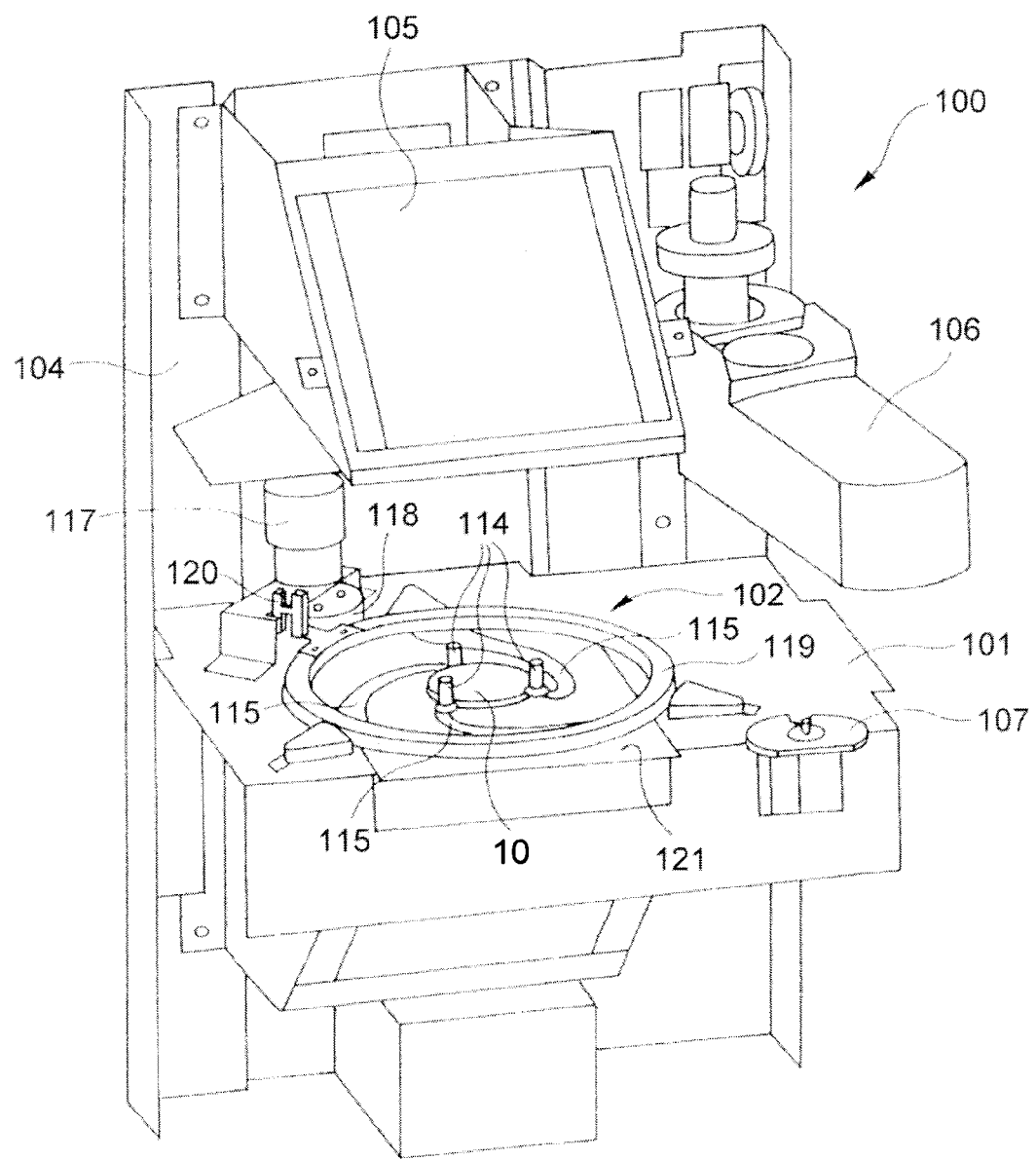
FIG. 7 is a general perspective view of a centering-and-blocking device.

FIG. 7 is a diagram of an embodiment of a centering-and-blocking device 100 that includes a work bench 101 on which there is placed a centering mechanism 102 for centering an ophthalmic lens 10.

The centering-and-blocking device 100 further includes a display screen 105 fastened to the structure 104 so as to face in a direction where it is visible to the user working at the work bench 101.

The centering mechanism 102 of the work bench 101 in this example has a set of three concentrically-clamping jaws 114 each carried by an arm 115 that pivots about an axis (not shown in FIG. 7) that is stationary relative to the work bench 101. The arms are arranged in such a manner that by rotating together about their respective axis they enable the three jaws 114 to be moved towards one another.

The clamping of the jaws 114 is controlled by a motor 117 having a shaft secured to a gearwheel 118 meshing with a ring 119 adapted to drive the arms 115 to pivot about their axis.

Each of the arms 115 has a semicircular toothed portion (not shown) meshing with the outer periphery of the ring 119.

Rotation of the gearwheel 118 under drive from the motor 117 thus causes the ring 119 to turn, thereby clamping or unclamping the jaws 114 depending on the direction in which the ring 119 is driven. An optical or electromagnetic cell 120 enables the motor 117 to know the position of the ring 119.

The assembly formed by the arms 115 carrying the jaws 114 and by the ring 119 is disposed above a support plate 121 that is adapted to pass light.

Furthermore, the centering-and-blocking device includes a positioning arm 106 (preferably an automatic arm) that is connected to the structure 104 and that is adapted to use a clamp to take hold of a blocking member located on a receptacle 107 and to place the blocking member at a location on the front face of said ophthalmic lens 10, which location is determined by calculation.

For this purpose, the centering-and-blocking device 100 is adapted to detect the position of a centering and/or axis-determining mark of the ophthalmic lens 10.

Figure 8:
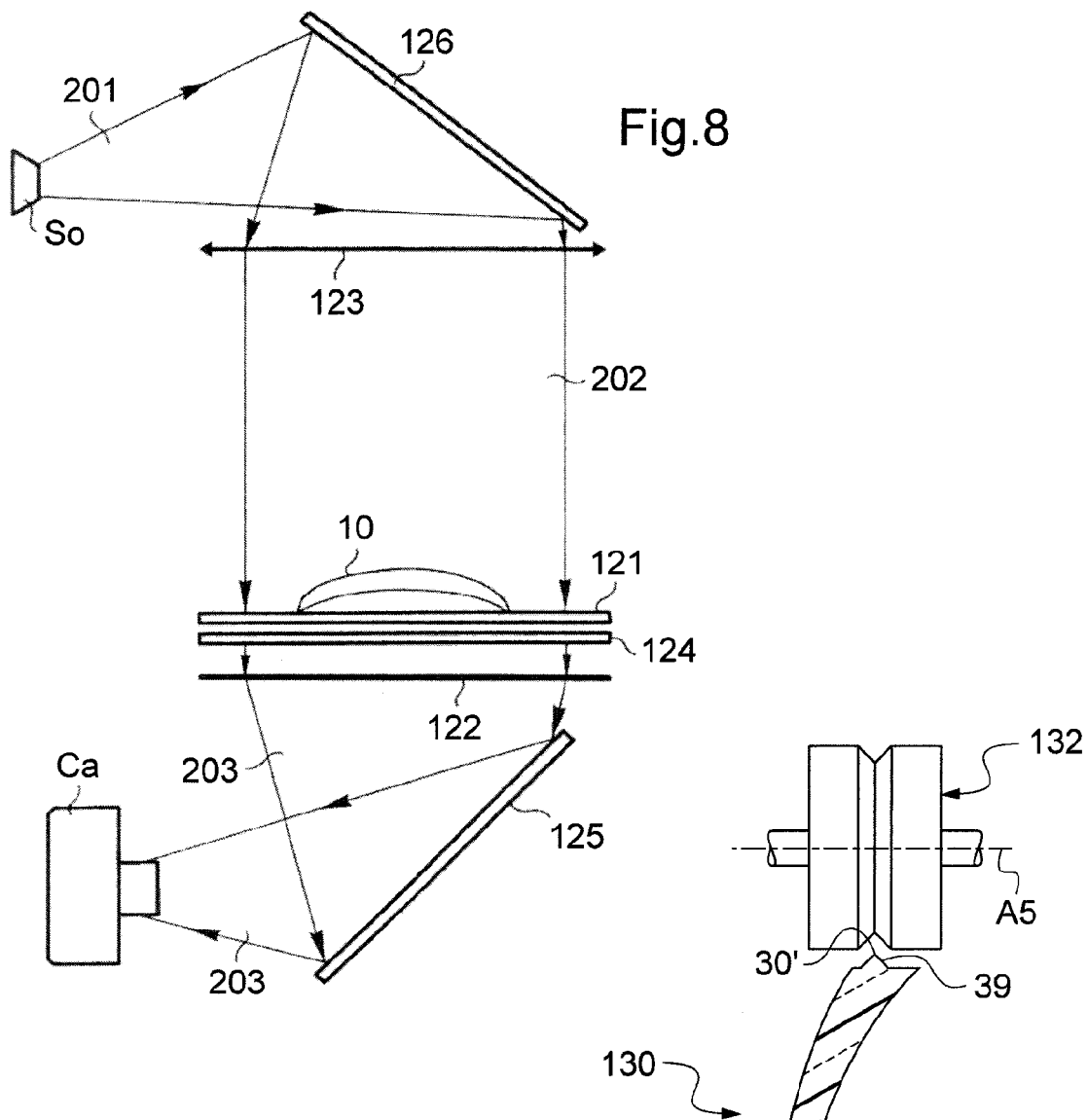
FIG. 8 is an optical diagram of the FIG. 7 device.

To do this, as shown diagrammatically in FIG. 8, the device advantageously comprises:
  receiver means for receiving the ophthalmic lens 10;
  on opposite sides of said receiver means, firstly lighting means for lighting the ophthalmic lens 10 installed on said receiver means, and secondly acquisition and analysis means for acquiring and analyzing the light transmitted by said ophthalmic lens 10; and
  a transparent support 124 for displaying an opaque sign located between said receiver means and said acquisition and analysis means, the sign being activatable and deactivatable.

In this example, the receiver means are constituted by the support plate 121 that is transparent to light.

In the example shown, the lighting means comprise a light source So that emits a diverging light beam 201 towards a reflector system comprising a mirror 126 inclined at 45° and a converging lens 123 adapted to form a parallel-ray light beam 202 propagating towards the ophthalmic lens 10 placed on the support plate 121 with its front face that is provided with the centering and/or axis-defining marks facing towards said converging lens 123.

In this example, the acquisition and analysis means comprise a digital camera Ca, image processor means (not shown) suitable for processing the signal obtained at the output from the digital camera Ca, and means for displaying the processed signal, said means being constituted by the display screen 105. Between the transparent sign support 124 and the digital camera Ca, said acquisition and analysis means include an optical system for reflecting the light beam transmitted by the ophthalmic lens 10, which system comprises a translucent plate 122 forming a screen and a mirror 125 inclined at 45°. The digital camera Ca looks through the optical angular reflector provided by the inclined mirror 125 to collect images or shadows projected on the translucent screen 122.

Figure 1:
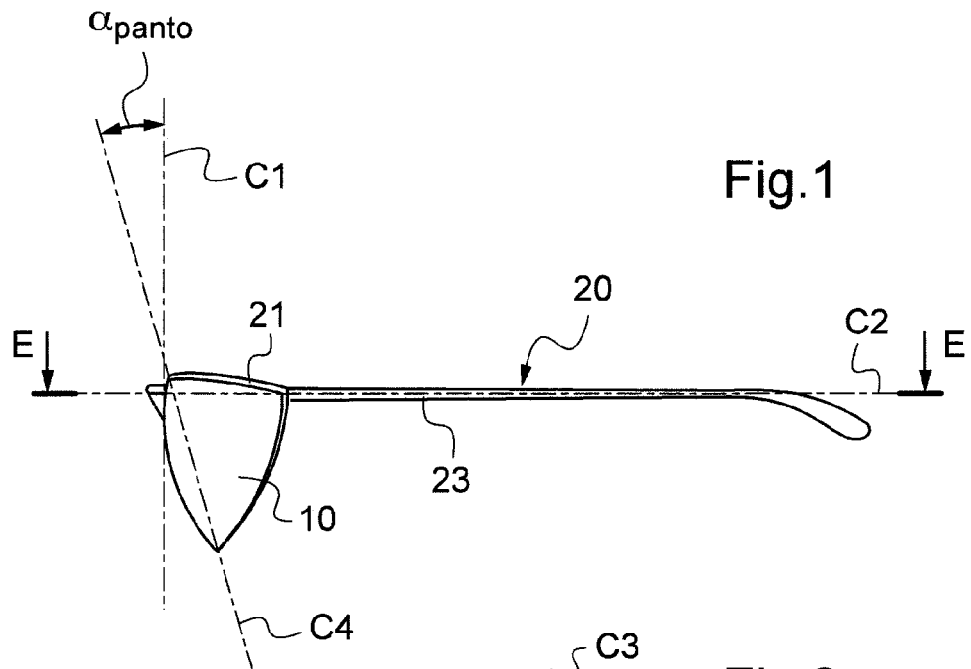
FIG. 1 is a diagrammatic side view of a pair of rimmed eyeglass.
Figure 2:
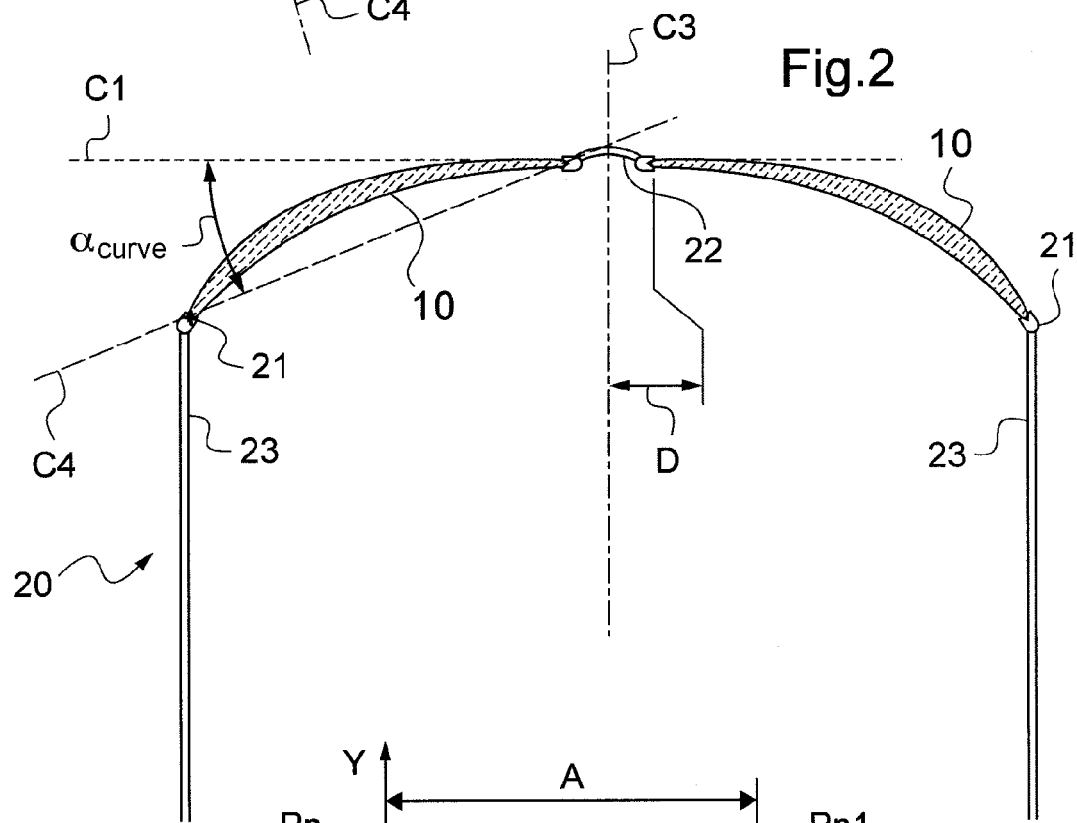
FIG. 2 is a diagrammatic view of the FIG. 1 pair of eyeglasses in section on plane E-E.

As shown in FIGS. 1 and 2, the eyeglass frame 20 is of the rimmed type. Naturally, the method could be applied equally well to centering lenses on half-rimmed or drilled eyeglass frames.

Prior to implementing the centering method, the optician has the future wearer select the desired shape of frame 20. This selection is made amongst the presentation eyeglass frame 20 that the optician possesses. In a variant, the selection could equally well be made on a computer screen, from a database register storing a plurality of eyeglass frame shapes.

As shown more particularly in FIGS. 1 and 2, each eyeglass frame 20 includes two rims 21, each serving to receive a respective right or left ophthalmic lens 10. These two rims 21 have respective inner longitudinal grooves (known to as "bezels") for engaging on engagement ridges (known as "bevels") running around the edge faces of the corresponding lenses. The two rims 21 are connected together by a bridge 22, and each of them is provided with a respective temple 23.

A substantially horizontal plane C2 is defined relative to the frame 20, which plane corresponds to the plane containing the two temples 23 of the frame 20 when they are in the deployed position. A vertical plane C3 is also defined corresponding to the plane of symmetry of the frame 20. A general plane C1 of the frame 20 is also defined as the plane containing the top of the bridge 22 of the frame 20 and that is orthogonal both to the vertical plane C3 of the frame 20 and to the horizontal plane C2 of the frame 20. Finally, a mean plane C4 is defined for each rim 21 as the plane that comes closest to the set of points defining the bottom of the bezel of the rim. The coordinates of this plane may for example be obtained by applying the least squares method to the coordinates of a plurality of points on the bottom of the bezel.

After the wearer has selected the frame, the optician acquires the shape of a longitudinal profile 30 corresponding to the line of the bottom of the bezel of the left rim 21 of the frame 20. To do this, the optician preferably makes use of an outline reader appliance, e.g. such as the appliance described in U.S. Pat. No. 5,802,731. An example of such an appliance is that sold by Essilor International under the trademark Kappa or Kappa CT.

To acquire the shape of this longitudinal profile 30, the optician locks the eyeglass frame in the appliance, and then starts the sequence for feeling both rims of the eyeglass frame 20. During this operation, a feeler follows the bottom of the bezel of the first rim and then of the second rim, so as to read a three-dimensional image of the first longitudinal profiles 30 of the two rims. The feeling may be performed with or without contact, i.e. by the feeler sliding mechanically along the bezel, or by optical reading.

With frames that are highly curved, i.e. strongly cambered, such reading is not possible. When the feeler feels the central zones of the frame, the steep inclination of the bezel causes the feeler to escape from the bezel.

The envisaged solution then consists in feeling each rim of the frame separately, after previously inclining the frame so that the mean plane of the rim for feeling is substantially perpendicular to the rotation axis of the feeler. That solution is effective since it reduces the inclination of the bezel seen by the feeler in the temporal zone of the rim, thereby avoiding the feeler escaping from the bezel. By using this method, two three-dimensional digital images are obtained, each of which comprises the longitudinal profile 30 of one of the two rims of the frame 20.

Once the feeling has been performed, the shape of the longitudinal profile 30 is stored in the processor unit of the centering device. The processor unit also stores the position of a horizon line 32 of the eyeglass frame 20 so as to enable the angular orientation of the longitudinal profile 30 to be identified relative to the horizontal.

Figure 3:
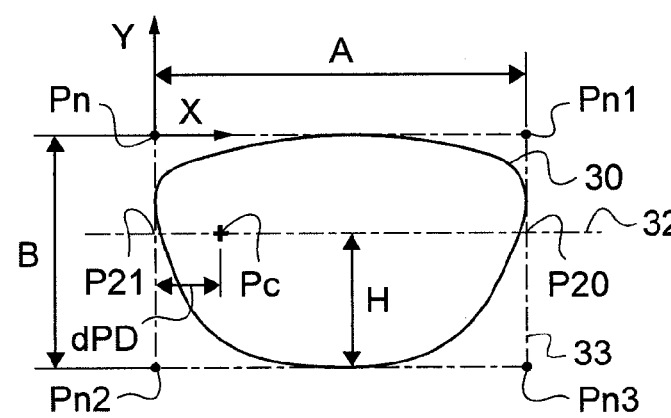
FIG. 3 is a plane projection of a longitudinal profile representative of the shape of one of the rims of the frame of the FIG. 1 pair of eyeglasses.

By convention, and as shown in FIG. 3, a hollow "box" 33 is defined relative to the longitudinal profile 30 in a manner well known to the person skilled in the art, the box corresponding to a virtual rectangular box circumscribing the longitudinal profile 30. The box 33 is oriented relative to the longitudinal profile 30 in such a manner that two of its edges are parallel to the horizon line 32. It has a length A and a height B. The box 33 presents a top left corner Pn (beside the bridge 22), a top right corner Pn1 (beside the temple 23), a bottom left corner Pn2, and a bottom right corner Pn3.

The optician also acquires characteristic values of the overall shape of the frame 20 selected by the wearer.

To do this, and with reference to FIGS. 1 and 2, two characteristic angles of the overall shape of the frame 20 are defined, comprising a curvature angle $alpha_{curve}$ and a pantoscopic angle $alpha_{panto}$.

The curvature angle $alpha_{curve}$ corresponds to the angle formed in the horizontal plane C2 between the mean plane C4 of the left rim 21 and the general plane C1 of the frame 20.

The pantoscopic angle $alpha_{panto}$ corresponds to the angle formed in the plane of symmetry C3 between the mean plane C4 of the left rim 21 and the general plane C1 of the frame 20.

These angle values may be obtained in various ways.

When the two first longitudinal profiles 30 appear in a single three-dimensional digital image, a first method consists in comparing the relative positions of these two first longitudinal profiles 30 so as to deduce therefrom the curvature angle $alpha_{curve}$.

A second method consists in measuring or in estimating these angle values, and in inputting them manually via a man-machine interface of the centering device. To measure the curvature angle $alpha_{curve}$, the optician may make use of a measurement nomogram. Such a nomogram may comprise, for example, two bundles of lines separated from each other by a length that is equal to the length of the bridge. Each line in each bundle presents a determined angle of inclination that corresponds to a particular curvature angle of the frame. To use the nomogram, the user positions the eyeglass frame on the screen so that the two rims of the frame overlie two of the lines of the nomogram. In this way, by reading the relative inclination of the two lines, the user can determine accurately the curvature angle of the frame and store it for the purpose of shaping the lenses. In order to measure the pantoscopic angle $alpha_{panto}$, the optician may make use of tools, such as "framing clips", that are elements for fastening to the temples of frames and that make it possible to read the angle of inclination of the rims relative to the frames, as seen from the side.

A third method consists in using a database register accessible to the optician or to the centering device. Such a register comprises a plurality of records each associated with a referenced type of eyeglass frame. Each record then comprises an identifier of the frame type, together with values for the curvature angle $alpha_{curve}$ and the pantoscopic angle $alpha_{panto}$ associated with that type of frame.

The values for the curvature and pantoscopic angles of the eyeglass frame 20 selected by the wearer are then acquired by searching the register for a record corresponding to the eyeglass frame, and if such a corresponding record is found, by reading the associated curvature and pantoscopic angles $alpha_{curve}$ and $alpha_{panto}$ from the record. By way of example, the identifier may be constituted by the reference of the frame or by the model name of the frame.

In any event, the optician then identifies the position of a pupil point Pc of the wearer relative to the longitudinal profile 30 (FIG. 3). The pupil point Pc corresponds to the point on the front face of the lens that faces the pupil of the wearer's eye when the wearer is wearing the eyeglass frame 20. The position of the pupil point Pc is generally identified relative to the box 33. For this purpose, the optician fits the selected eyeglass frame 20 on the wearer and then marks each of the presentation lenses delivered with the frame manually with the pupil point Pc that corresponds to the point located facing the pupil of the wearer's eye.

To identify the position of the pupil point Pc relative to the box 33, the optician then uses a rule to measure two parameters associated with the wearer's morphology in the general plane C1 of the frame 20. The optician acquires the pupil half-distance dPD defined as the horizontal distance between the pupil point Pc and the left edge of the box 33. The optician also acquires the pupil height H of the left pupil of the wearer by determining the vertical distance between the pupil point Pc and the bottom edge of the box 33. Knowledge of these two parameters thus enables the position of the longitudinal profile 30 to be situated relative to the pupil point Pc.

In a variant, the optician may perform the same operation with the help of a pupillometer (PDmeter) or software for acquiring and processing digital images of the kind described in documents U.S. Pat. No. 5,617,155A and ES 2 043 546, serving to identify the pupil point Pc from a digital photo of the face of the wearer while wearing the eyeglass frame.

Figure 4:
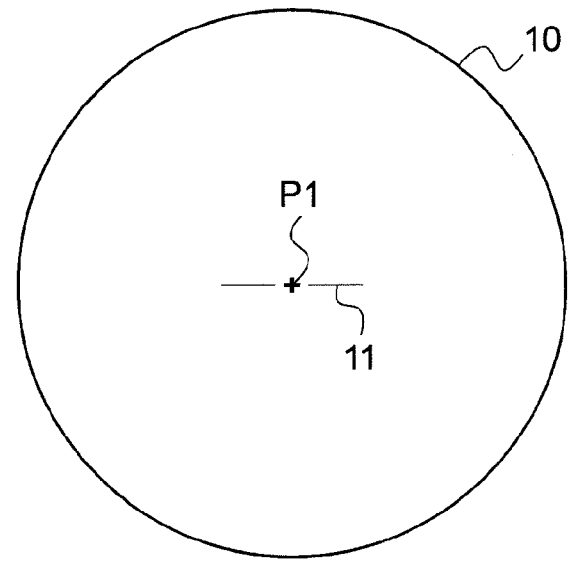
FIG. 4 is a diagrammatic face view of an ophthalmic lens that has not been shaped.

As shown in FIG. 4, the optician also has a non-shaped ophthalmic lens 10 with refringence properties corresponding to the wearer's prescription. The prescription corresponds to the correction to be applied to each eye of the wearer so as to give the wearer good visual acuity in near vision and/or far vision, depending on whether the lens is a single-vision lens, a bifocal lens, or a lens with progressive addition of power.

The refringence properties of the lens are generally defined in terms of refringence powers. Only two such refringence powers are defined herein, namely spherical refringence power and cylindrical refringence power.

The "spherical refringence power" of a lens for an incident beam passing through the lens (also referred to as the total power or the refringent power or the focusing power or the spherical optical power) is defined as being the magnitude that characterizes and quantifies the first effect of spherical refringence (the "magnifying glass" effect) of the lens on the beam under consideration: if it is positive, the lens has a converging effect on the light beam; if it is negative, the effect on the light beam is diverging. The point of the lens where the magnifying glass effect is zero (i.e., for a lens having spherical optical power only, the point where the incident ray and the transmitted ray have the same axis) is called the optical centering point.

The "cylindrical refringence power" of a lens for an incident ray passing through the lens (also referred to as the cylindrical optical power) is defined as being the magnitude that characterizes and quantifies the cylindrical refringence effect exerted by the lens on the ray in question, whereby it forms not one but two focal areas, which are situated in different planes, generally mutually perpendicular planes, and which are referred to as the tangential focal plane and the sagittal focal plane.

This cylindrical power, also referred to as "astigmatism power" or merely as "astigmatism", corresponds to the difference in spherical powers for the two focal areas. The two areas are identified by an axis passing through their "optical centering point", commonly referred to as the cylinder axis. This cylinder axis is general defined in degrees, relative to a position-identifying line of the lens.

The non-shaped ophthalmic lens 10 presents an initial outline of known shape, generally of circular shape, and an optical centering point P1 of known position. The non-shaped ophthalmic lens 10 is identified in three dimensions by its optical centering point P1 and by a position-identifying line 11 that enables its orientation relative to its optical centering point P1 to be identified.

The position of the optical centering point P1 of the ophthalmic lens 10 (generally different from its geometrical center), and the position of its position-identifying line 11, may be detected by using various techniques, depending on the type of ophthalmic lens and on the equipment available to the optician. For example, the technique may be of the deflectometer, interferometer, or indeed image processing type. In this example it is preferably implemented by means of the above-mentioned centering-and-blocking device 100.

For a single-vision ophthalmic lens, the device used serves to determine the orientation of the cylinder axis of the lens relative to its position-identifying line 11. For an ophthalmic lens with progressive power variation (a progressive lens), the device used serves to determine the positions of marks etched in the lens or printed on one of its faces, so as to determine the orientation of its so-called "horizontal" axis.

At this step, the processing software has thus acquired and stored the optical frame of reference of the ophthalmic lens 10 defined by its centering point P1 and by its position-identifying line 11. This frame of reference is thus defined in a reference plane, specifically a plane that is orthogonal to the optical axis of the lens (an axis that passes through the front and rear faces of the lens) and that coincides with the mean plane C4 of the rim 21 of the eyeglass frame 20 (when the lens 10 is mounted on the eyeglass frame 20).

At this step, the processing software has also acquired and stored both the frame of reference of the rim 21 of the eyeglass frame 20 as defined by the pupil point Pc and by the horizon line 32, and the position and the orientation of the longitudinal profile 30 in said frame or reference of the rim 21. The frame of reference of the rim 21 is also defined in a reference plane of the eyeglass frame, corresponding in this example to the general plane C1 of the frame 20.

The following step then consists in positioning and orientating the longitudinal profile 30 in the optical frame of reference of the ophthalmic lens 10 so as to determine the outline to which the lens should be shaped.

The processing software then proceeds to bring the frames of reference of the ophthalmic lens 10 and of the rim 21 into coincidence so as to define the position and the orientation of the longitudinal profile 30, not in the frame of reference of the rim, but directly in the optical frame of reference of the ophthalmic lens 10.

This putting into coincidence is performed in two steps, comprising a step of superposing the two frames of reference (FIG. 5) and a step of offsetting the two frames of reference so as to take account of the fact that the measurements made in the two frames of reference were taken in two planes of reference C1 and C4 that are inclined relative to each other.

Figure 5:
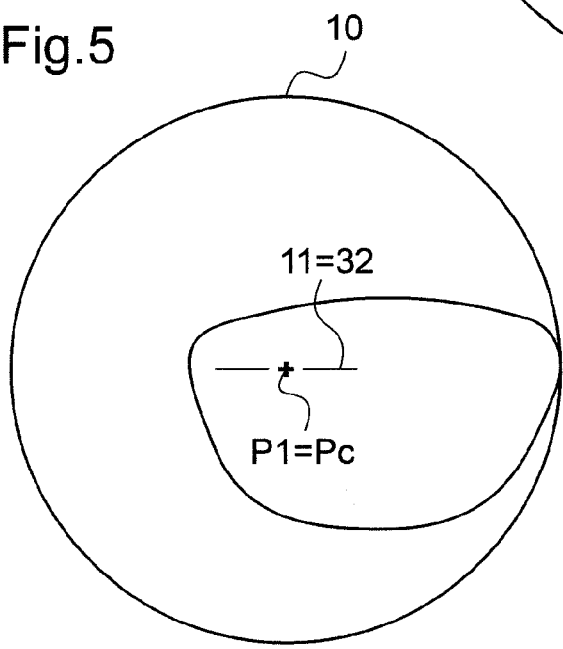
FIG. 5 is a diagrammatic face view of the FIG. 4 ophthalmic lens, with the longitudinal profile of FIG. 3 superposed thereon.

During the first step, the software superposes the two frames of reference virtually so that the centering point P1 of the lens 10 is superposed on the pupil point Pc, and so that the position-identifying line 11 is properly oriented relative to the horizon line 32, in compliance with a prescription for the future wearer of the eyeglass frame. As shown in FIG. 5, the position-identifying line is "properly" oriented when it is superposed on the horizon line 32. Naturally, and more generally, the position-identifying line is "properly" oriented when its orientation corresponds to the orientation of the cylinder axis or of the horizontal axis as prescribed for the wearer.

Figure 10:
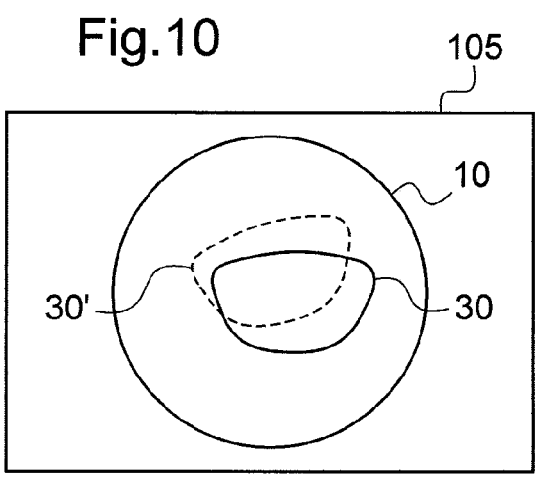
FIG. 10 is a diagrammatic view of the screen of the FIG. 7 device.

Once the two frames of reference are superposed, the software causes the longitudinal profile 30 to be displayed on the display screen 105 of the centering-and-blocking device 100 (FIG. 10).

As explained above, the frames of reference of the lens and of the eyeglass frame are identified in planes that are inclined relative to each other. More precisely, the plane of the optical frame of reference of the lens is inclined horizontally relative to the plane of the frame of reference of the rim 21 by an angle corresponding to the curvature angle $alpha_{curve}$, and it is inclined vertically to the plane of the frame of reference of the rim 21 by an angle corresponding to the pantoscopic angle $alpha_{panto}$.

This inclination thus produces an offset that needs to be taken into account in order to center the ophthalmic lens optimally in the rim of the eyeglass frame.

In order to take this inclination into account, the processing software offsets the pupil point Pc relative to the centering point P1 by an offset vector having a horizontal component dx and a vertical component dy. It also offsets the horizon line 32 angularly relative to the position-identifying line 11 through an offset angle dtheta.

The horizontal and vertical components dx and dy of the offset vector and this offset angle dtheta are deduced in this example not only from the curvature angle $alpha_{curve}$, but also from the pantoscopic angle $alpha_{panto}$.

To calculate these values, consideration is given to a first orthonormal coordinate system (O, X, Y, Z) shown in FIG. 3, associated with the frame of reference of the rim of the eyeglass frame. The origin O of this coordinate system corresponds to the center of the bridge of the frame 20, the directed vector X is parallel to the long sides of the box 33 and the directed vector Y is parallel to the short sides of the box 33.

A second coordinate system (O, Va, Vb, Vc) is also taken into consideration, which system is associated with the frame of reference of the lens 10. The origin O of this coordinate system coincides with the origin of the first frame of reference. The directed vector Va corresponds to the transform of the vector PnPn1 into the plane C4 of the frame of reference of the lens 10, after rotation through the curvature angle $alpha_{curve}$ and the pantoscopic angle $alpha_{panto}$. The directed vector Vb corresponds to the transform of the vector PnPn2 in the plane C4 of the frame of reference of the lens 10 after rotation through the curvature angle $alpha_{curve}$ and the pantoscopic angle $alpha_{panto}$. The directed vector Vc is defined as the vector product of the first two directed vectors Va and Vb.

Two rotation matrices can be defined for passing from the first frame of reference to the second, which matrices are thus associated with the curvature angle $alpha_{curve}$ and with the pantoscopic angle $\alpha_{panto}$. These rotation matrices present the following forms:

$$Rot(\alpha_{curve}) = \begin{bmatrix} \cos(\alpha_{curve}) & 0 & -\sin(\alpha_{curve}) \\ 0 & 1 & 0 \\ \sin(\alpha_{curve}) & 0 & \cos(\alpha_{curve}) \end{bmatrix}$$

$$Rot(\alpha_{panto}) = \begin{bmatrix} 1 & 0 & 0 \\ 0 & \cos(\alpha_{panto}) & \sin(\alpha_{panto}) \\ 0 & -\sin(\alpha_{panto}) & \cos(\alpha_{panto}) \end{bmatrix}$$

The vectors Va and Vb are then expressed as follows:

$$\vec{V_a} = Rot(\alpha_{panto})Rot(\alpha_{curve})\begin{bmatrix} A \\ 0 \\ 0 \end{bmatrix}$$

$$\vec{V_b} = Rot(\alpha_{panto})Rot(\alpha_{curve})\begin{bmatrix} 0 \\ -B \\ 0 \end{bmatrix}$$

Or expressed differently:

$$\vec{V'_a} = \begin{bmatrix} A\cos(\alpha_{curve}) \\ A\sin(\alpha_{curve})\sin(\alpha_{panto}) \\ A\sin(\alpha_{curve})\cos(\alpha_{panto}) \end{bmatrix}$$

$$\vec{V_b} = \begin{bmatrix} 0 \\ -B\cos(\alpha_{panto}) \\ B\sin(\alpha_{panto}) \end{bmatrix}$$

By assuming that the front face of the ophthalmic lens 10 is circumscribed on a sphere of radius R and that this sphere passes via the two midpoints P20 and P21 of the two short sides of the box 33, it can be deduced that the center C of the sphere presents, in the first frame of reference, the following coordinates:

$$\begin{bmatrix} (A+D)/2 \\ -B/2 \\ \sqrt{R^2 - (A/2)^2} \end{bmatrix}$$

with D equal to half the length of the bridge.

These coordinates, expressed in the second frame of reference, are then expressed as follows:

$$\begin{bmatrix} D/2 \\ 0 \\ 0 \end{bmatrix} + Rot(\alpha_{panto})Rot(\alpha_{curve})\begin{bmatrix} A/2 \\ -B/2 \\ \sqrt{R^2 - (A/2)^2} \end{bmatrix}$$

Knowing the coordinates of this sphere, it is then possible to determine the position of the pupil point Pc in the first frame of reference. It has the following coordinates:

$$Pc = \begin{bmatrix} dPD \\ H - B \\ C_z - \sqrt{(dPD - C_x)^2 + (H - B - C_y)^2} \end{bmatrix}$$

The point where the pupil point Pc is projected onto the second frame of reference is referred to as the projected pupil point Pcp. Its coordinates are expressed as follows:

$$Pcp = Pn + \frac{u \cdot \vec{V_a}}{\|\vec{V_a}\|} + \frac{v \cdot \vec{V_b}}{\|\vec{V_b}\|}$$

with $$\begin{cases} u = \dfrac{\vec{PcPn} \cdot \vec{V_a}}{\|\vec{V_a}\|} \\ v = \dfrac{\vec{PcPn} \cdot \vec{V_b}}{\|\vec{V_b}\|} \end{cases}$$

The pupil half-distance dPDc and the pupil height Hc as corrected to take account of the curvature and pantoscopic angle can then be calculated as follows:

$$dPDc = D/2 + u$$

and $$Hc = B - v$$

Consequently, the components dx and dy of the offset vector are expressed as follows:

$$dx = dPDc - dPD$$

and $$dy = Hc - H$$

By way of illustration, the component dx of the offset vector has a value of 0.7 millimeters (mm) for a strongly curved eyeglass frame presenting the following characteristics: A=60 mm; B=26 mm; dPD=33 mm; H=13 mm; D=18 mm; $\alpha_{panto} = 10°$; $\alpha_{curve} = 25°$.

The offset angle dtheta is calculated in corresponding manner. For this calculation, consideration is given to the vector $V_{axis}$ as the vector that defines the direction of the axis of the lens in the first frame of reference. This vector is expressed as follows:

$$\vec{V_{axis}} = \begin{bmatrix} \cos(\pi - \theta_{LensAxis}) \\ \sin(\pi - \theta_{LensAxis}) \\ 0 \end{bmatrix}$$

The vector $V_{axis2}$ is defined as the projection of the vector $V_{axis}$ into the second frame of reference. This vector $V_{axis2}$ is expressed as follows:

$$\vec{V_{axis2}} = \begin{bmatrix} \cos(\pi - \theta_{LensAxis}) \\ \sin(\pi - \theta_{LensAxis}) \\ t \end{bmatrix}$$

The coordinate t can be calculated by considering the directed vector Vc, which is equal to the vector product of the vectors Va and Vb. The vector products of this directed vector Vc multiplied by the vector $V_{axis2}$ is zero. The coordinate t of the vector $V_{axis2}$ can thus be calculated using the following formula:

$$t = \frac{\tan(\alpha_{curve})\cos(\pi - \theta_{LensAxis})}{\cos(\alpha_{panto})} - \tan(\alpha_{panto})\sin(\pi - \theta_{LensAxis})$$

By means of this vector $V_{axis2}$, it is possible to deduce the offset angle dtheta by considering two possibilities.

If the pantoscopic angle $\alpha_{panto}$ is not zero, then:

$$d\theta = \theta_{LensAxis2} - \theta_{LensAxis}$$

with $$\theta_{LensAxis2} = \arctan\left(\frac{v1}{u1}\right),$$

$$u1 = \frac{-\vec{V}_{axis2} \cdot \vec{V}_a}{\|\vec{V}_{axis2}\|\|\vec{V}_a\|}$$

and $$v1 = \frac{-\vec{V}_{axis2} \cdot \vec{V}_b}{\|\vec{V}_{axis2}\|\|\vec{V}_b\|}$$

If the pantoscopic angle $\alpha_{panto}$ is zero, then:

$$d\theta = \theta_{LensAxis2} - \theta$$

with $$\theta_{LensAxis2} = \arctan(\tan(\theta_{LensAxis})\cos(\alpha_{curve}))$$

By way of illustration, the offset angle dtheta for the above-described eyeglass frame is equal to 4.26°.

At this stage, because of the values of the horizontal and vertical components dx and dy of the offset vector and because of the offset angle dtheta, the processor unit can specifically determine the position of the longitudinal profile 30' in the frame of reference of the lens 10, as shown in FIG. 6.

Once the two frames of reference have been brought into coincidence, the software causes the longitudinal profile 30' to be displayed on the display screen 105, which profile is then offset relative to the previously displayed longitudinal profile 30 (FIG. 10). This display may be performed in such a manner that the two profiles 30 and 30' are superposed, so that the optician can access the magnitude of the offset, or in such a manner that the longitudinal profile 30' replaces the longitudinal profile 30.

Preferably, the software also causes the display screen 105 to display the initial (circular) outline of the ophthalmic lens 10. This enables the optician to verify that the longitudinal profile 30' does not extend beyond the outline of the ophthalmic lens 10. This verification may naturally also be performed automatically by the software.

If the longitudinal profile 30' extends beyond the circular outline of the ophthalmic lens 10, then the optician of the software may implement a method of correcting the position and/or the orientation of the longitudinal profile 30', of the kind described in document WO 2007/026058.

In any event, the centering method is followed by a step of blocking and by a step of shaping the ophthalmic lens 10.

The blocking step is performed by the centering-and-blocking device 100 of FIG. 7, using its positioning arm 106.

During this step, the positioning arm 106 positions the blocking member on the front face of the ophthalmic lens 10 at a given blocking point and with a given blocking orientation relative to the frame of reference of the ophthalmic lens. Thus, when the lens with its blocking member is transferred to the shaper appliance, the appliance can obtain the position and the orientation of the frame of reference of the lens and can shape the lens in that frame of reference.

The blocking point is generally selected to correspond to the center of the box 33, i.e. the point of intersection of its diagonals. This position makes it possible to ensure that while the lens is being machined, the machining tool remains at a distance from the blocking member and passes around it without machining it.

In this embodiment of the invention, the lens is centered prior to being blocked. As a result, the selection of the blocking point and of the blocking orientation already takes account of the offset of the frame of reference of the rim 21 relative to the frame of reference of the lens 10. Consequently, this offset no longer needs to be taken into account during the stage of shaping the lens, since the blocking member is already properly centered relative to the longitudinal profile 30'.

In a variant, in a second embodiment, the lens may be blocked even before the frame of reference of the lens 10 has been made to coincide with the frame of reference of the rim 21 of the eyeglass frame 20. It can be understood that under such circumstances, the position and the orientation of the blocking member are determined as a function of the position of the longitudinal profile 30. It is then appropriate during the shaping stage to machine the lens by offsetting the position and the orientation of the longitudinal profile 30' relative to the blocking member.

The blocking member in this example comprises three portions, namely a block for blocking on the shaper appliance, an intermediate element referred to as a pad, and a sticker for sticking to the front face of the lens. Here the sticker is stuck to the lens at the same time as the pad and the block. If it were to be stuck to the lens before centering the lens, it would run the risk of interfering with optical measurements for centering. More precisely, even if transparent, such a sticker would run the risk of making the acquisition of the position of the centering point P1 and the orientation of the position-identifying line 11 more difficult and less accurate.

Consequently, the pad is initially stuck to the sticker, possibly while being centered and oriented appropriately, and then the block is stuck to the pad, and finally the assembly is stuck to the lens after the centering operation.

Figure 9:
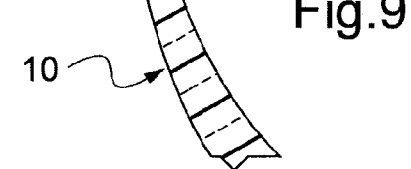
FIG. 9 is a diagrammatic view of a shaper appliance.

The step of shaping the ophthalmic lens is performed by means of a shaper appliance 130 of the type shown diagrammatically in FIG. 9. This operation serves to form an engagement ridge 39 (also known as a bevel) on the edge face of the lens, which ridge extends along the longitudinal profile 30' and is adapted to engage in the bezel of the rim 21 of the frame 20 selected by the wearer.

In this example, the shaper appliance 130 comprises support means formed by shafts 131 for holding the ophthalmic lens 10 and for driving it in rotation about a blocking axis A4. Such a shaper appliance also includes shaper means formed by a machining tool 132 mounted to rotate about a machining axis A5, which in this example is substantially parallel to the blocking axis A4, but which could also be inclined relative thereto.

The machining tool 132 and/or the shaft 131 are provided with two freedoms of movement relative to each other, one freedom to move radially so as to modify the difference between the machining axis A5 and the blocking axis A4, and another freedom to move in axial translation along an axis parallel to the blocking axis A4.

The shaper appliance 130 also has an electronic and/or computer device (not shown) that is provided firstly with means for communicating with the centering-and-blocking device 100, and secondly with means for controlling the movements of the shafts 131 and of the machining tool 132. The electronic and/or computer device serves in particular, in each angular position of the lens 10 about the blocking axis A4, to control the radial distance between the machining tool 132 and the blocking axis A4, and also the axial position of the edge face of the lens relative to the working surface of the machining tool 132.

As shown more particularly in FIG. 9, the machining tool 132 is constituted in particular by a main shaping grindwheel, i.e. a grindwheel having a recess, like a negative, for making a complementary machined profile having the section of the engagement ridge 39 that is to be obtained projecting from the edge face of the lens that is being machined.

In the embodiment described, the calculation of the offset between the two frames of references is performed by the centering-and-blocking device 100. Naturally, this calculation could equally well be performed by the electronic and/or computer device of the shaper appliance 130.

The present invention is not limited in any way to the embodiments described and shown, and the person skilled in the art knows how to apply any variants thereto in accordance with its spirit.

In particular, when the eyeglass frame selected by the wearer is of the drilled type (rimless), the positions of the holes for drilling are advantageously determined in the frame of reference of the ophthalmic lens 10, after it has been put into coincidence with the frame of reference of the rim 21 of the eyeglass frame 20. Provision could also be made to calculate the orientation of the drilling axis for each of the drill holes in the same frame of reference, so as to take account of the curvature angle $alpha_{curve}$ and of the pantoscopic angle $alpha_{panto}$ of the eyeglass frame.

In another embodiment of the invention, provision could be made to use a database register to determine the components dx and dy of the offset vector and the offset angle dtheta.

The database register may then comprise a plurality of records each associating a referenced type of eyeglass frame. Each record includes an identifier for the referenced type of eyeglass frame, a curvature parameter or a curvature compensation specific to the type of eyeglass frame that has been referenced, and a pantoscopic parameter or a pantoscopic compensation specific to the type of eyeglass frame that has been referenced.

The curvature parameter is preferably constituted by the curvature angle $alpha_{curve}$ of the frame. The pantoscopic parameter is preferably constituted by the pantoscopic angle $alpha_{panto}$ of the frame.

In this way, in order to acquire the curvature parameter of the frame 20 selected by the wearer, it is necessary to search in the register for a record corresponding to said eyeglass frame 20, and then to read from said record the associated curvature parameter.

If no record is found, provision may optionally be made for the curvature angle $alpha_{curve}$ and/or the pantoscopic angle $alpha_{panto}$ to be acquired from the eyeglass frame 20 by one of the methods described above, and then to create a new record in the register corresponding to the selected eyeglass frame 20, so as to store therein the acquired curvature parameter.

Thereafter, the components dx and dy of the offset vector and the offset angle dtheta can be calculated using the method described above.

In a variant, the database register may include an identifier of the referenced eyeglass frame type, a curvature compensation parameter specific to said referenced eyeglass frame type, and a pantoscopic compensation parameter specific to the referenced eyeglass frame type.

In this variant, the stored parameters are no longer the curvature angle $alpha_{curve}$ and/or the pantoscopic angle $alpha_{panto}$ of the eyeglass frame 20, but directly the components dx and dy of the offset vector and the offset angle dtheta. The register thus makes it omit the step of calculating the components dx and dy and the offset angle dtheta.

In this variant, each record of the database register is associated with an eyeglass frame and includes a plurality of fields each associated with a prescription for the wearer. More precisely, each field is associated with a given angle $theta_{LensAxis}$ with a given pupil half-distance dPD and with a given pupil height H.

On the basis of the frame identifier, the optician can thus search the register for a record corresponding to the frame selected by the wearer, and then from the prescriptions $theta_{LensAxis}$, dPD and H of the wearer, determine the field corresponding to those prescriptions, so as to acquire the components dx and dy of the offset vector and the corresponding offset angle dtheta.

Naturally, in this example also, if the data is not already stored in the database register, provision can be made to acquire the data using one of the methods described above, in order to store the data in a new field of a record in the database register.

The invention claimed is:

1. A method of preparing an ophthalmic lens (10) for mounting in a rim (21) of an eyeglass frame (20), the method comprising the steps of:
   acquiring a frame of reference of the ophthalmic lens (10) defined at least by a first centering point (P1) and by a first orientation direction (11);
   acquiring firstly a frame of reference of the rim (21) of the eyeglass frame (20) defined at least by a second centering point (Pc) and by a second orientation direction (32), and secondly a longitudinal profile (30, 30') that is representative of the shape of the rim (21) and that is identified in the frame of reference of the rim (21); and
   putting the frames of reference of the ophthalmic lens (10) and of the rim (21) of the eyeglass frame (20) into coincidence, by positioning the two centering points (P1, Pc) relative to each other and by orienting the two orientation directions (11, 32) relative to each other in such a manner as to define the position and the orientation of the longitudinal profile (30, 30') in the frame of reference of the ophthalmic lens (10);
   wherein the method includes a step of acquiring a curvature parameter ($alpha_{curve}$) or a curvature compensation parameter (dtheta) relating to the camber of the eyeglass frame (20), and in that the relative orientation of the two orientation directions (11, 32) is determined as a function of said acquired curvature ($alpha_{curve}$) or curvature compensation (dtheta) parameter.

2. The preparation method according to claim 1, further including a step of determining a pantoscopic parameter ($alpha_{panto}$) or a pantoscopic compensation parameter relating to the vertical inclination of the rim (21) relative to the general plane (C1) of the eyeglass frame (20), and wherein the relative orientation of the two orientation directions (11, 32) is determined as a function of said pantoscopic parameter (alpha$_{panto}$) or of said pantoscopic compensation parameter.

3. The preparation method according to claim 1, further including a step of determining a pantoscopic parameter (alpha$_{panto}$) or a pantoscopic compensation parameter relating to the vertical inclination of the rim (21) relative to the general plane (C1) of the eyeglass frame (20), and wherein the relative positioning of the two centering points (P1, Pc) is performed as a function of said pantoscopic parameter (alpha$_{panto}$) or of said pantoscopic compensation parameter.

4. The preparation method according to claim 1, wherein the two centering points (P1, Pc) are positioned relative to each other as a function of said curvature parameter (alpha$_{curve}$) or of said curvature compensation parameter (dtheta).

5. The preparation method according to claim 1, wherein said curvature parameter (alpha$_{curve}$) is deduced by feeling the bezels of the two rims (21) of the eyeglass frame (20), the feeling being performed with or without contact.

6. The preparation method according to claim 1, further including the following steps:
   searching a database register in which each record is associated with a referenced eyeglass frame type and contains a curvature parameter or a curvature compensation parameter specific to said referenced eyeglass frame type, for a record corresponding to said eyeglass frame (20), and then
   when a corresponding record is found, performing said acquisition step by reading in said corresponding record said curvature parameter (alpha$_{curve}$) or said curvature compensation parameter (dtheta), and
   when no corresponding record is found, following said acquisition step by a step of writing a new record in the register corresponding to said eyeglass frame (20) in which the acquired curvature parameter (alpha$_{curve}$) or curvature compensation parameter (dtheta) is stored.

7. The preparation method according to claim 2, further including the following steps:
   searching a database register in which each record is associated with a referenced eyeglass frame type and contains a pantoscopic parameter or a pantoscopic compensation parameter specific to said referenced eyeglass frame type, for a record corresponding to said eyeglass frame (20); and then
   when a corresponding record is found, performing said determination step by reading said pantoscopic parameter (alpha$_{panto}$) or said pantoscopic compensation parameter from said corresponding record, and
   when no corresponding record is found, following said determination step by a step of writing a new record in the register corresponding to said eyeglass frame (20), in which the determined pantoscopic parameter (alpha$_{panto}$)) or pantoscopic compensation parameter is stored.

8. The preparation method according to claim 3, further including the following steps:
   searching a database register in which each record is associated with a referenced eyeglass frame type and contains a pantoscopic parameter or a pantoscopic compensation parameter specific to said referenced eyeglass frame type, for a record corresponding to said eyeglass frame (20); and then
   when a corresponding record is found, performing said determination step by reading said pantoscopic parameter (alpha$_{panto}$) or said pantoscopic compensation parameter from said corresponding record, and
   when no corresponding record is found, following said determination step by a step of writing a new record in the register corresponding to said eyeglass frame (20), in which the determined pantoscopic parameter (alpha$_{panto}$)) or pantoscopic compensation parameter is stored.

9. The preparation method according to claim 1, in which putting the frames of reference of the ophthalmic lens (10) and of the rim (21) of the eyeglass frame (20) into coincidence further comprises:
   a step of superposing the two frames of reference, during which the two centering points (P1, Pc) are superposed and the two orientation directions (11, 32) are oriented relative to each other in accordance with a prescription for the future wearer of the eyeglass frame (20); and then
   a step of offsetting the two frames of reference, during which, firstly the second centering point (Pc) is offset relative to the first centering point (P1) by an offset vector (dx, dy) deduced from said curvature parameter (alpha$_{curve}$) or from said curvature compensation parameter (dtheta), and secondly the second orientation direction (32) is offset angularly relative to the first orientation direction (11) by an offset angle (dtheta) deduced from said curvature parameter (alpha$_{curve}$) or from said curvature compensation parameter (dtheta).

10. The preparation method according to claim 9, wherein said curvature compensation parameter is constituted by said offset angle (dtheta).

11. The preparation method according to claim 9, further including a step of displaying in superposition, firstly the longitudinal profile (30) defined in the frame of reference of the ophthalmic lens (10) after it has been merely superposed on the frame of reference of the rim (21) of the eyeglass frame (20), and secondly the longitudinal profile (30') defined in the frame of reference of the ophthalmic lens (10) after it has been offset and put into coincidence relative to the frame of reference of the rim (21) of the eyeglass frame (20).

12. The preparation method according to claim 11, wherein, during the display step, the outline of the non-shaped ophthalmic lens (10) is displayed in superposition on each displayed longitudinal profile (30, 30').

13. The preparation method according to claim 1, further including a step of displaying the longitudinal profile (30') defined in the frame of reference of the ophthalmic lens (10) after it has been put into coincidence relative to the frame of reference of the rim (21) of the eyeglass frame (20).

14. The preparation method according to claim 13, wherein, during the display step, the outline of the non-shaped ophthalmic lens (10) is displayed in superposition on each displayed longitudinal profile (30, 30').

15. The preparation method according to claim 1, the method further comprising:
   a step of blocking the ophthalmic lens (10) by means of a blocking device (100), during which a blocking member is fastened on the ophthalmic lens (10) at a given blocking point and with a given blocking orientation; and
   a step of shaping the ophthalmic lens (10) by means of a shaper device (130), during which the ophthalmic lens (10) is shaped so as to present, on its edge face, an engagement ridge or groove (39) extending along the longitudinal profile (30').

16. The preparation method according to claim 15, wherein the frames of reference of the ophthalmic lens (10) and of the rim (21) of the eyeglass frame (20) are put into coincidence before the ophthalmic lens is blocked, so that the position of the blocking point and the orientation of the blocking are determined in the frame of reference of the rim (21) of the eyeglass frame (20) after it has been put into coincidence with the frame of reference of the ophthalmic lens (10).

17. The preparation method according to claim 15, wherein the frames of reference of the ophthalmic lens (10) and of the rim (21) of the eyeglass frame (20) are put into coincidence after the ophthalmic lens has been blocked and before the ophthalmic lens is shaped.

\* \* \* \* \*

UNITED STATES PATENT AND TRADEMARK OFFICE
CERTIFICATE OF CORRECTION

PATENT NO. : 8,419,183 B2
APPLICATION NO. : 12/634774
DATED : April 16, 2013
INVENTOR(S) : Stephane Boutinon Page 1 of 1

It is certified that error appears in the above-identified patent and that said Letters Patent is hereby corrected as shown below:

In the Specification:

In column 13, line 34, please replace "$d\theta = \theta_{LensAxis2} - \theta$" with -- $d\theta = \theta_{LensAxis2} - \theta_{LensAxis}$ --

In the Claims:

In claim 7, column 17, line 54, please replace "$(alpha_{panto}))$" with -- $(alpha_{panto})$ --

In claim 8, column 18, line 5, please replace "$(alpha_{panto}))$" with -- $(alpha_{panto})$ --

Signed and Sealed this
Second Day of July, 2013

Teresa Stanek Rea
*Acting Director of the United States Patent and Trademark Office*